Jan. 3, 1933. F. M. JAHN ET AL 1,892,671
OPHTHALMIC MOUNTING
Filed July 8, 1930
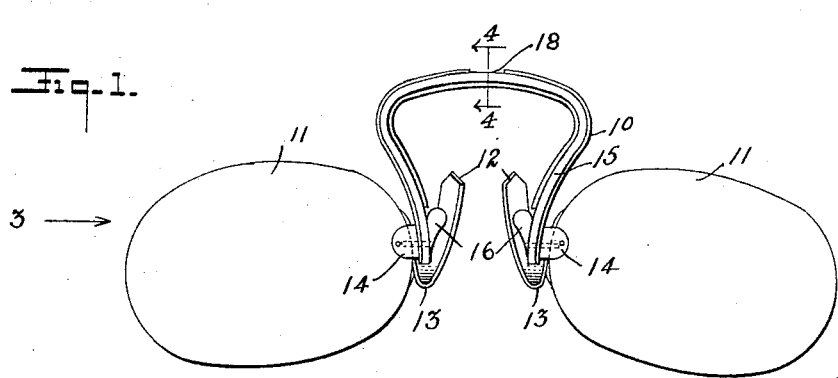
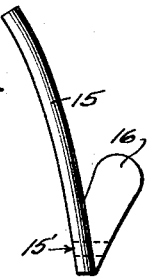
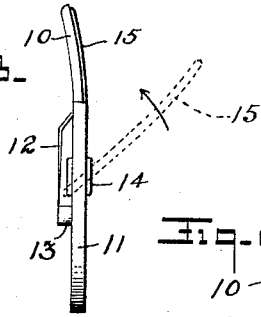
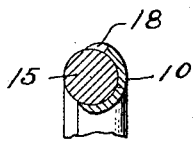
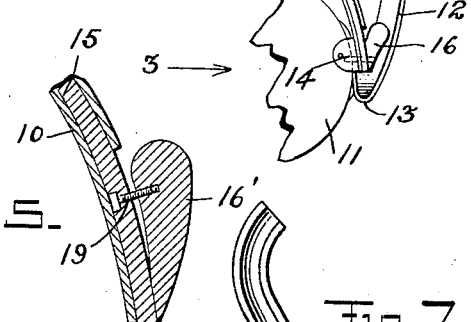
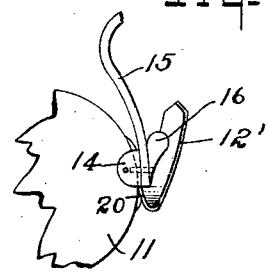
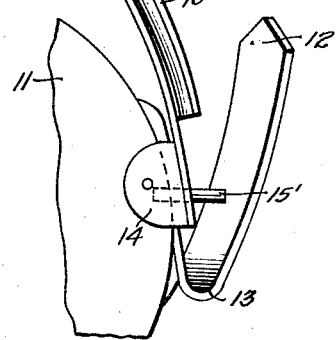
INVENTORS
Francis M. Jahn
Cecil C. Atkinson
BY
Joshua R. H. Potts
THEIR ATTORNEY Patented Jan. 3, 1933

1,892,671

UNITED STATES PATENT OFFICE

FRANCIS M. JAHN AND CECIL C. ATKINSON, OF PHILADELPHIA, PENNSYLVANIA

OPHTHALMIC MOUNTING

Application filed July 8, 1930. Serial No. 466,479.

This invention relates to ophthalmic mountings, and has for an object to provide, a new and improved type of mounting, offering additional security and convenience.

A further object of the invention is to provide a mounting having a frame part, which fixedly supports lenses at pre-determined adjusted positions, and improved means for co-acting with said frame part, for clamping the mounting upon the nose.

A further object of the invention is to provide a mounting, having a frame member adapted to be adjusted by bending to a pre-determined fixed relation preliminary to wearing, and with improved manually operable means for clamping the frame and lenses upon the nose.

A further object of the invention is to provide, a mounting comprising a frame part adapted to hold lenses in pre-determined fixed relation, with resilient clamping members carried thereby, and manually operable wedging members adapted to clamp the clamping members upon the nose.

A further object of the invention is to provide in an improved ophthalmic mounting, a resilient nose clamping part, a wedge member manually movable into wedging position between the resilient part and the fixed part for the purpose of clamping the nose.

A further object of the invention is to provide, a frame member with lens supporting parts, and resilient nose clamping parts, with a cam member adapted to be manually introduced into wedging relation with the resilient part, said cam being adjustable in its amplitude.

The invention therefore comprises resilient nose clamping parts, and fixed parts, said fixed parts being adapted for co-action with lenses, and with manually operable parts including wedging cam members adapted to be introduced between the fixed parts and the resilient parts to move the resilient parts into clamping engagement with the nose.

The invention is directed to other objects and possesses other features of novelty and advantage, some of which, together with the foregoing, will be hereinafter more fully set forth.

In the drawing:

Figure 1 is a view in front elevation of the improved ophthalmic mounting, associated with lenses in the usual manner, Figure 2 is a fragmentary, front elevation of a slightly modified type, Figure 3 is a view in edge elevation of the type shown at Figures 1 and 2, as indicated by arrows 3 at such figures, Figure 4 is a transverse sectional view through the frame and bail taken on line 4—4 of Figure 1, Figure 5 is a detail sectional view of a modification showing an adjustable cam member, Figure 6 is a still further modification, said view being shown as a fragment in front elevation, Figure 7 is a view in front elevation on an enlarged scale of the frame and spring clamp member, and Figure 8 is a view in front elevation on an enlarged scale of an end of the bail and wedge cam.

Like characters of reference indicate corresponding parts throughout the several views.

The ophthalmic mounting, which forms the subject matter of this application, is adapted to be expressed in several somewhat modified physical types. As shown at Figure 1, a frame 10 is employed, being preferably of channel formation, as shown more particularly at Figure 4, such channel formation being contoured to correspond to other co-acting elements. The frame member 10 is connected with the lenses 11 in substantially the usual and ordinary manner.

Attached also to the frame member, are spring members 12 which serve as nose clamps, being preferably provided with a return bend 13 to provide the necessary attachment and resiliency. While any type of connection between the frame 10, and the lenses 11, is within the scope of the present invention, there is shown in the drawing, lugs 14 for the purpose. It will be understood that the particular showing of these lugs 14 is no limitation as they will vary in accordance with the variations of interpupilary distances and will be longer or shorter as regards the interval between the frame 10 and lenses 11, as such requirements dictate.

A bail 15 is fulcrumed at 15' to the lugs 14 at its opposite ends and is curved to coincide with the frame 10, and of such proportions transversely, as to lie within the channel of the member 10, as shown more particularly at Figure 4. The bail 15 is free to swing upon its pivots 15' from the closed position shown at Figures 1 and 4 to the dotted line position shown at Figure 3. The bail is also provided with cams 16, which are rigidly attached thereto and so related to the springs 12, that when the bail and its wedge members are swung to the dotted line position as shown at Figure 3, the wedges will release engagement with the springs 12, but when closed to the position shown in full lines at Figures 1 and 3, will ride upon the remote inclined surfaces of the springs 12 and flex them to a greater convergence, that is to say, under such action, the springs 12 will approach each other to maintain interval and clamp upon the interposed nose.

At Figure 2, the structure is identical to that described in regard to Figure 1, except that the bail 15 has been replaced by a pair of levers 17 which take the place of the bail 15, but are individually operated. Whereas the bail 15 is a continuous member having its opposite ends connected with the cams 16, there are two of the levers 17, one at each side. With the bail 15, provision must be made for manually opening the parts, such provision being by way of a notch 18 formed in the frame member 10 so that a finger nail may be inserted back of the bail 15 to displace it.

At Figure 5, the cam 16' is shown as being adjustable by means of an adjusting screw 19, which will move the cam 16' further from or nearer to the bail 15 thereby varying the amplitude of movement of the clamping members 12.

The frame member 10 may be wholly omitted and the clamping members 12', as shown at Figure 6, may be returned upon themselves as shown at 20, so that the cam 16 will simply wedge against such member 12, the spacing of the lenses being maintained by the bail 15.

In the fitting of this mounting to a patient, the optician will, after selecting the proper mounting as regards the lugs 14, bend the frame 10 so that the released positions of the springs 12 will just clear the position of the clamps upon the nose. In the type shown at Figures 1 and 5, the bail 15 will also be similarly bent, as an accompaniment to the bending of the frame 10. In the type shown at Figure 2, employing the levers 17, only the frame member 10 need be bent, while at the type shown at Figure 6, with the frame member omitted, only the bail member need be bent.

Of course, the ophthalmic mounting, herein illustrated, may be modified in various ways without departing from the invention herein set forth and hereinafter claimed.

The invention is hereby claimed as follows:

1. An ophthalmic mounting comprising resilient nose clamping members, cams adapted to move said members against their resiliency to nose clamping positions, rigid means interconnecting the cams as a unit, and a lens carrying frame supporting said several parts.

2. An ophthalmic mounting comprising resilient nose clamping members, a lens carrying frame member rigidly spacing said clamping members, and cams pivoted to said frame adapted to move said clamping members against their resiliency to clamping positions.

3. An ophthalmic mounting comprising resilient nose clamping members, a lens supporting frame rigidly spacing said clamping members, cams pivoted to said frame and adapted to wedgingly engage the clamping members, and a member coinciding with the frame member and at its spaced extremities connected to the cams.

4. An ophthalmic mounting comprising a lens carrying frame, a bail pivoted to the frame, cams carried by the bail, and resilient nose clamping members carried by the frame presenting inclined surfaces to the path of movement of the cams upon their pivots.

5. An ophthalmic mounting comprising a curved frame, a bail coinciding in curvature to the frame and having its ends pivoted to the frame adjacent the spaced ends of the frame, cams carried by the bail, means to adjust the amplitude of the cams, and clamping members presenting inclined surfaces to the path of travel of the cams.

6. An ophthalmic mounting comprising similarly curved frame member and bail member, one of which members is adapted to partially embrace the other, said member being pivotally connected adjacent their extremities, cams carried by the bail, and spring clamping means carried by the frame and presenting inclined bearing surfaces to the path of movement of the cams.

7. An ophthalmic mounting comprising resilient nose clamping members, cams adapted to move said members against their resiliency to nose clamping position, means providing fixed paths of movement of the cams, a lens supporting frame appropriately supporting said instrumentalities and means to move the arms.

In testimony whereof we have signed our names to this specification.

FRANCIS M. JAHN.
CECIL C. ATKINSON.